United States Patent
Xie et al.

(10) Patent No.: US 11,619,945 B2
(45) Date of Patent: Apr. 4, 2023

(54) MAP PRIOR LAYER

(71) Applicant: GM CRUISE HOLDINGS LLC, San Francisco, CA (US)

(72) Inventors: Chen Steve Xie, San Francisco, CA (US); Zachary Garcia, San Francisco, CA (US); Michael Rusignola, Burlingame, CA (US); Matthew Fox, San Francisco, CA (US); Nick Tran, Diablo, CA (US); Katherine Anne Fotion, San Francisco, CA (US); Divya Thakur, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 543 days.

(21) Appl. No.: 16/588,452

(22) Filed: Sep. 30, 2019

(65) Prior Publication Data

US 2021/0096575 A1    Apr. 1, 2021

(51) Int. Cl.
| | |
|---|---|
| *G05D 1/02* | (2020.01) |
| *G06N 20/00* | (2019.01) |
| *G06F 16/29* | (2019.01) |
| *B60W 50/00* | (2006.01) |
| *G05D 1/00* | (2006.01) |
| *G06N 7/00* | (2006.01) |

(52) U.S. Cl.
CPC ....... *G05D 1/0221* (2013.01); *B60W 50/0097* (2013.01); *G05D 1/0088* (2013.01); *G06F 16/29* (2019.01); *G06N 7/00* (2013.01); *G06N 20/00* (2019.01)

(58) Field of Classification Search
CPC .... G05D 1/0221; G05D 1/0088; G06N 20/00; G06N 7/00; G06F 16/29; B60W 50/0097
See application file for complete search history.

(56) References Cited

U.S. PATENT DOCUMENTS

| | | | |
|---|---|---|---|
| 7,693,653 | B2 | 4/2010 | Hussain et al. |
| 9,682,624 | B1 * | 6/2017 | Koehler ............... B60T 13/586 |
| 10,872,379 | B1 * | 12/2020 | Nepomuceno ... G08G 1/096775 |
| 2011/0087433 | A1 | 4/2011 | Yester |
| 2018/0370530 | A1 | 12/2018 | Ishikawa |
| 2019/0077398 | A1 | 3/2019 | Kusano et al. |
| 2019/0135296 | A1 | 5/2019 | Hummelshoj |
| 2019/0266418 | A1 | 8/2019 | Xu et al. |

(Continued)

FOREIGN PATENT DOCUMENTS

CN     106652468 B     9/2019

OTHER PUBLICATIONS

International Search Report and Written Opinion for International Application No. PCT/US2019/068340, dated Jun. 25, 2020, 9 pages.

*Primary Examiner* — Ig T An
(74) *Attorney, Agent, or Firm* — Polsinelli PC

(57) ABSTRACT

Systems, methods, and devices are disclosed for mapping historical information about behaviors of objects (vehicles, bicycles, pedestrians, etc.) at a location. Based on the mapped historical information, a prediction is determined about a behavior of an object proximate to an autonomous vehicle at the location, where the prediction is based on a statistical analysis of the historical information that is applied to the object. One or more behaviors of the AV are affected based on the prediction.

20 Claims, 8 Drawing Sheets

(56) References Cited

U.S. PATENT DOCUMENTS

| | | |
|---|---|---|
| 2019/0295419 A1 | 9/2019 | Tosa et al. |
| 2019/0333373 A1* | 10/2019 | Fang et al. |
| 2020/0201334 A1* | 6/2020 | Max .................... G08G 1/0129 |
| 2020/0255027 A1* | 8/2020 | Kulkarni ............ G01C 21/3602 |
| 2020/0284883 A1* | 9/2020 | Ferreira ................. G01S 17/10 |
| 2020/0364469 A1 | 11/2020 | Fowe |
| 2021/0088784 A1 | 3/2021 | Whitmire et al. |
| 2021/0224556 A1 | 7/2021 | Xu et al. |

\* cited by examiner

MAP PRIOR LAYER

TECHNICAL FIELD

The present technology pertains to updating a portion of a map database using data of proximate objects, and more specifically pertains to predicting object behavior proximate to a navigating autonomous vehicle.

BACKGROUND

An autonomous vehicle (AV) is a motorized vehicle that can navigate without a human driver. In order to navigate, the AV uses maps of the environment from which it extracts routes to specific destinations. Such maps include high fidelity lidar point information (e.g., a base layer), information regarding features in the environment such as traffic lights, sidewalks, drivable area, etc. (e.g., a ground truth layer), and derived semantic features like lanes, traffic light controls, lane linking, etc. (e.g., a derived layer). While the AV must adhere to the rules present in these maps (e.g. at a four way intersection, the only available options for the AV are to turn left, go straight, or turn right)—other vehicles on the road do not. For example, other vehicles can make an illegal u-turn at a four way intersection, cut off other vehicles when changing lanes, change lanes mid-intersection, or behave in other ways that an AV would not behave based on the rules of the road.

Since lanes in the maps are used to indicate maneuvers that the AV can perform, there is no way to predict the behavior of other vehicles that perform maneuvers that the AV should not (or cannot). While a kinematic prediction model can observe other vehicles on the road to predict future behavior for a vehicle driving erratically, kinematic predictions are inaccurate for systemic maneuvers from other vehicles. What is needed is a way to accurately predict systemic real world behavior of other vehicles on the road. More accurate predictions based on real world behavior can enable better safety protocols, especially when other vehicles behave illegally or more aggressively than the AV.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
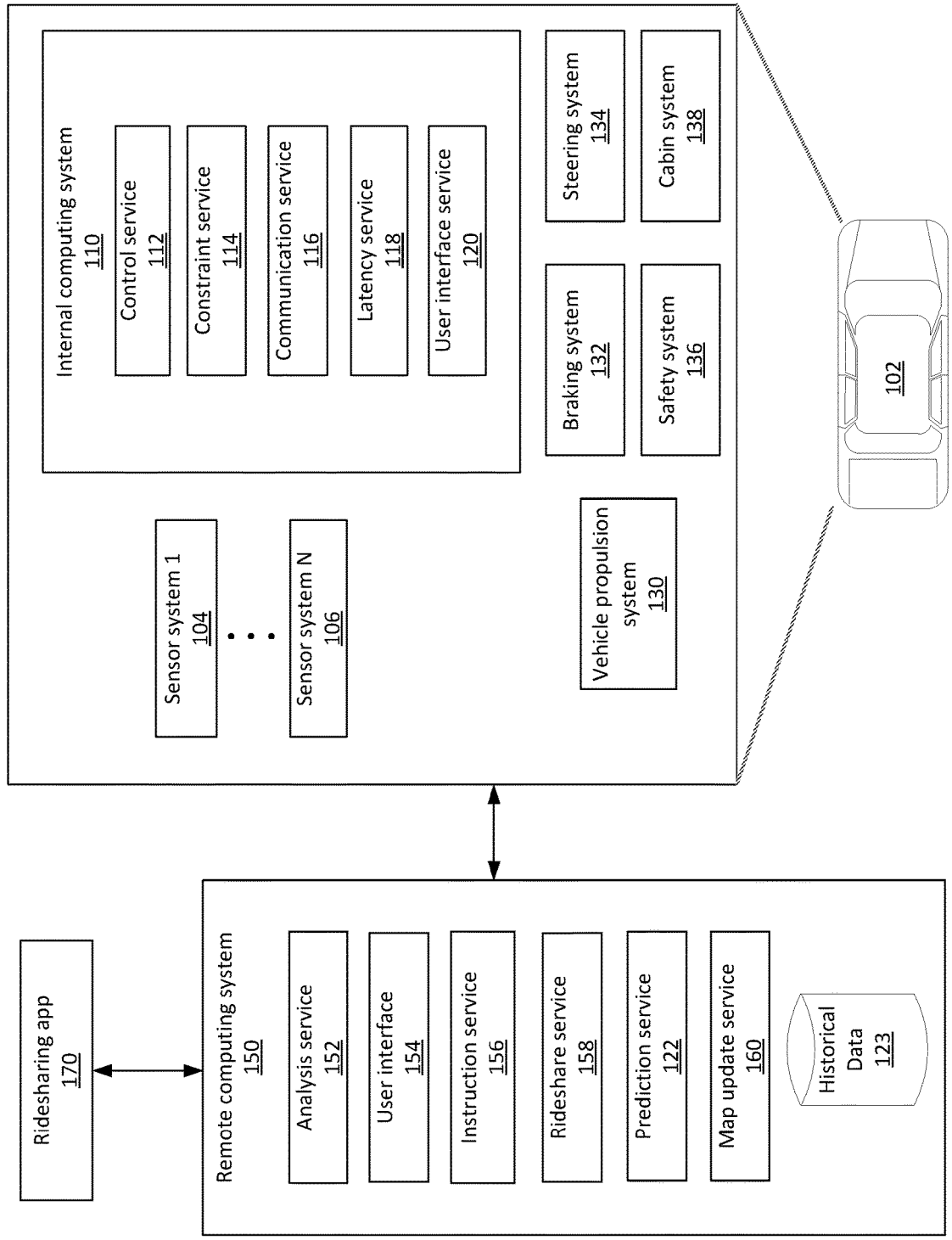
FIG. 1 illustrates an example schematic diagram of an autonomous vehicle and network environment in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

An example autonomous vehicle (AV) includes a plurality of sensor systems, such as, but not limited to, a camera sensor system, a lidar sensor system, a radar sensor system, amongst others, where the AV operates based upon sensor signals output by the sensor systems. Specifically, the sensor signals are provided to an internal computing system in communication with the plurality of sensor systems, where a processor executes instructions based upon the sensor signals to control a mechanical system of the AV, such as a vehicle propulsion system, a braking system, or a steering system.

The disclosed technology addresses the need in the art for accurately predicting what other vehicles, bicycles, pedestrians, etc. (e.g., any object on and/or proximate to the AV on the road) will do. Other vehicles may, for example, deviate from expected or conventional rules of the road due to any number of reasons such as, but not limited to, driver negligence/recklessness (e.g., switching lanes within an intersection at rush hour, cutting off cars while merging on another highway, etc.), accident (e.g., switching lanes within an intersection because the road paint has faded), or due to unforeseen circumstances (e.g., swerving along a road to avoid overgrown trees, potholes, dangerous road conditions, etc.). Being able to predict these types of behaviors can enrich safety protocols the AV uses to anticipate and/or avoid otherwise unexpected and potentially dangerous behavior from other vehicles on the road. In order to do so, the set of rules the AV uses to drive should be informed and/or enhanced by historical knowledge of any systemic behavior of other vehicles on the road.

The techniques discussed herein enable the addition of probability information to the map that the AV uses to drive and/or navigate. For example, a probability layer added to the map can include historical probability information, where the probability information can be the basis for a prediction of other vehicle behaviors (based on an analysis of historical data that indicates systemic behaviors). The probability information can be added as "map priors", for example, which can be a data-driven, geolocation-based intelligence which adds an information edge for routing the AV. In this way, the AV can easily distinguish between what maneuvers it is allowed to perform (as dictated by a semantic layer of the map) and how other vehicles may behave based on past knowledge (map priors).

At a particular location, for example, the system can determine that other vehicles on the road are performing maneuvers that would otherwise violate the semantic map. In response, the system can create a probabilistic understanding via the map prior layer in order to anticipate these maneuvers. For example, the system can record or receive statistics of vehicles traveling through that location, either with a surveying operation or via data collected from the fleet of AVs, to gain prior knowledge of systemic behaviors at that location. This can form the basis of a historical data database. The statistical information regarding prior knowledge of the location can then inform a statistical prediction for how other vehicles will travel through that location. In some instances, the map prior layer can reflect the chance that another vehicle may deviate from normal driving conventions in a particular way that conforms to the observed systemic behaviors.

In some embodiments, for example, the map prior layer can include a table which indicates a relationship between pairs of lanes. The table could identify lanes between which other vehicles (or bicycles, pedestrians, etc.) are often observed making the same types of illegal or otherwise unrepresented maneuvers. In addition, the AV can base its prediction of other vehicles on weighted probabilities derived from the map prior statistics.

In some embodiments, if the map prior data (e.g., historical data) is recorded from a portion of or the entire fleet of AVs, the historical data may be continuously updated in the most recent maps. The historical data may be both location and time dependent. In order to predict vehicle behavior from the historical data, in some embodiment's heuristic models can identify systemic behavior for inclusion within the map prior layer. For example, if in multiple locations it is detected that vehicles are using center reversible lanes to enter subsequent left turn lanes, the map prior layer can include the possibility of similar behavior in every location with the same lane configuration. Also, it is to be understood that the invention may apply to other moving bodies other than vehicles (e.g. pedestrians walking across unmarked paths, bicyclists, etc.).

In the following systems and methods, the present technology maps historical information about behaviors of objects (vehicles, bicycles, pedestrians, etc.) at a location. Based on the mapped historical information, a prediction is determined about a behavior of an object proximate to an autonomous vehicle at the location, where the prediction is based on a statistical analysis of the historical information that is applied to the object. One or more behaviors of the AV are affected based on the prediction. In other words, the present technology makes predictions about tracked objects in the vicinity of the AV, and that affects AV behavior based on the prediction.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an autonomous vehicle (AV) AV internal computing system 110 that is in communication with the sensor systems 104-106 and the systems 130, 132, 134, 136, and 138. The AV internal computing system 110 includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

The remote computing system 150 can also include a prediction service 122 that utilizes one or more models (e.g., heuristics, machine learned models, etc.) to analyze historical data 123. Historical data 123 can be data either received or captured via sensor system 1 104 . . . sensor system N 106 about objects proximate to the autonomous vehicle 102, such as other vehicles, bicycles, pedestrians, or other entities that are not controllable. The analysis of the historical data 123 can determine a probabilistic prediction of how these objects may behave and/or interact with autonomous vehicle 102 on the road. Map update service 160 takes the prediction from prediction service 122 and implements the statistical behavior of the objects at a mapped location (e.g., updates the map with associated statistical information that prediction service 122 can utilize to make predictions).

Figure 2:
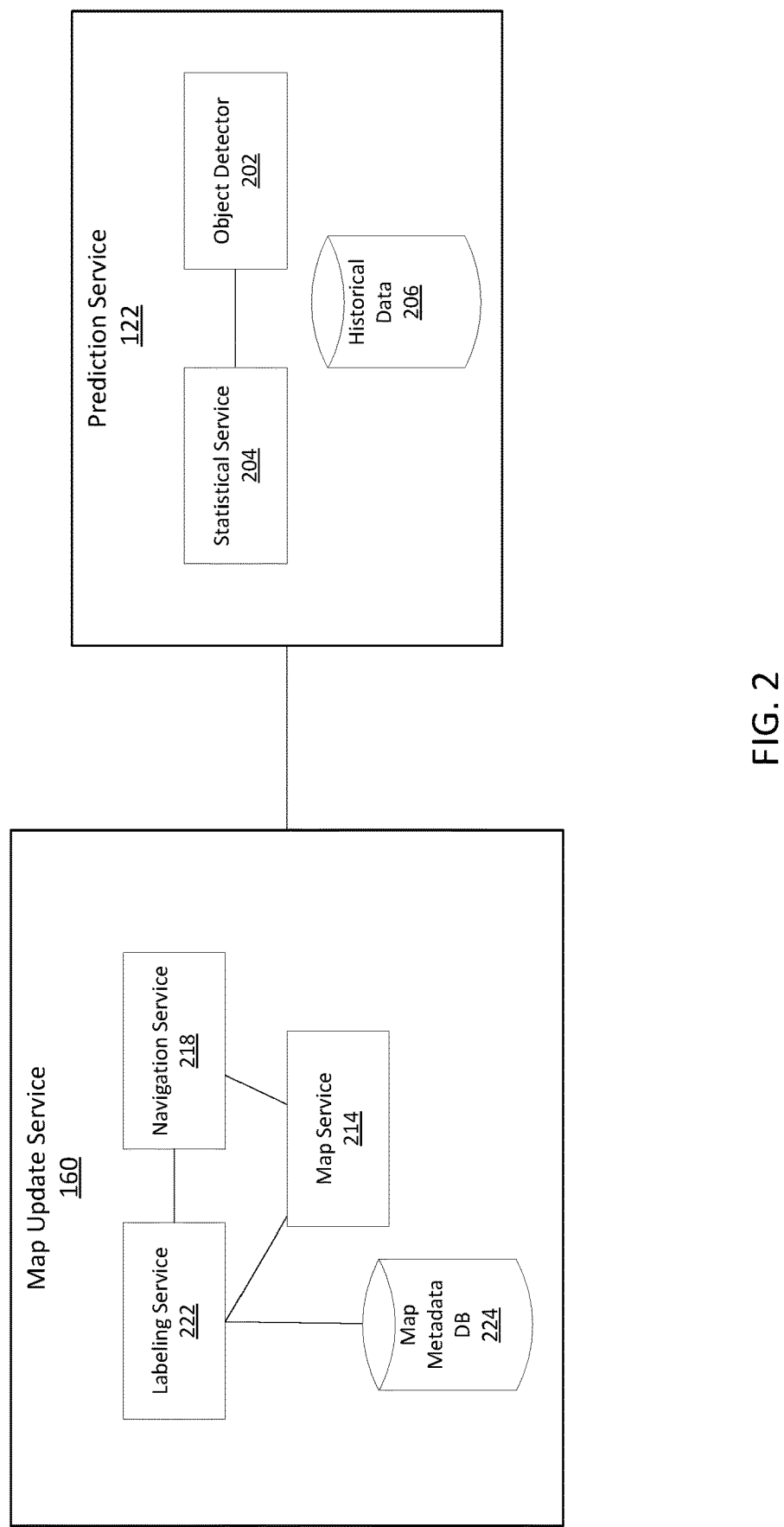
FIG. 2 shows an example system for predicting object behavior proximate to a navigating autonomous vehicle in accordance with some aspects of the present technology.

FIG. 2 illustrates an example system embodiment showing the map update service 160 and the prediction service 122 in greater detail. While the system illustrated in FIG. 2 is discussed with respect to the method illustrated in FIG. 3, it should be appreciated that each of the figures represents their own separate embodiment and should not be limited by such cross-reference between the figures except as defined in the claims.

The prediction service 122 functions to determine how vehicles on the road may interact with the AV based on historical data 206. In some embodiments, historical data 206 may be received from a manual study or a third party service (such as traffic cameras, road studies, etc.). In other embodiments, historical data 206 is captured by sensors 104-106. While in some embodiments, sensors 104-106 may capture data at a lower resolution than is reflected in the high definition map, the current data captured by sensors 104-106 can be sufficient to determine vehicle behavior. The historical data 123 from sensors 104-106 reflect the maneuvers of the vehicles of the road within the time interval the data is collected.

As the autonomous vehicle 102 navigates a route, sensors 104-106 capture current data reflecting the environment around the autonomous vehicle 102. The object detector 202 can accumulate the historical data 206 from the at least one sensor 104-106 as the autonomous vehicle 102 passes through a geographic area. Even over a small distance, object detector 202 can accumulate historical data 206 from the same sensor as the sensor continuously collects data. For example, in the case of a LIDAR sensor, the LIDAR continuously creates a point map of objects on the road from historical data 206 collected from the environment around the autonomous vehicle 102, and this data is aggregated by object detector 202.

The statistical service 204 can analyze the historical data 206 based on one or more models (heuristics, machine learned (ML) models, etc.) to determine object behavior probabilities within the geographic area. The statistical service 204 can send the object behavior probabilities to the map update service 160 for inclusion in the map. In some embodiments, the geographic area can be bounded by location coordinates such as might be reflected on a tile of a physical map.

In some embodiments, map service 214 can receive the object behavior probabilities and add that information to the map. To do so, map service 214 can add the probabilistic information to map metadata database 224, which can store metadata that associates the map portion with the probabilistic determinations from statistical service 204. The labelling service 222 may implement the metadata within the map so that navigation service 218 can provide routing in response to the probabilistic information associated with the metadata.

Figure 3:
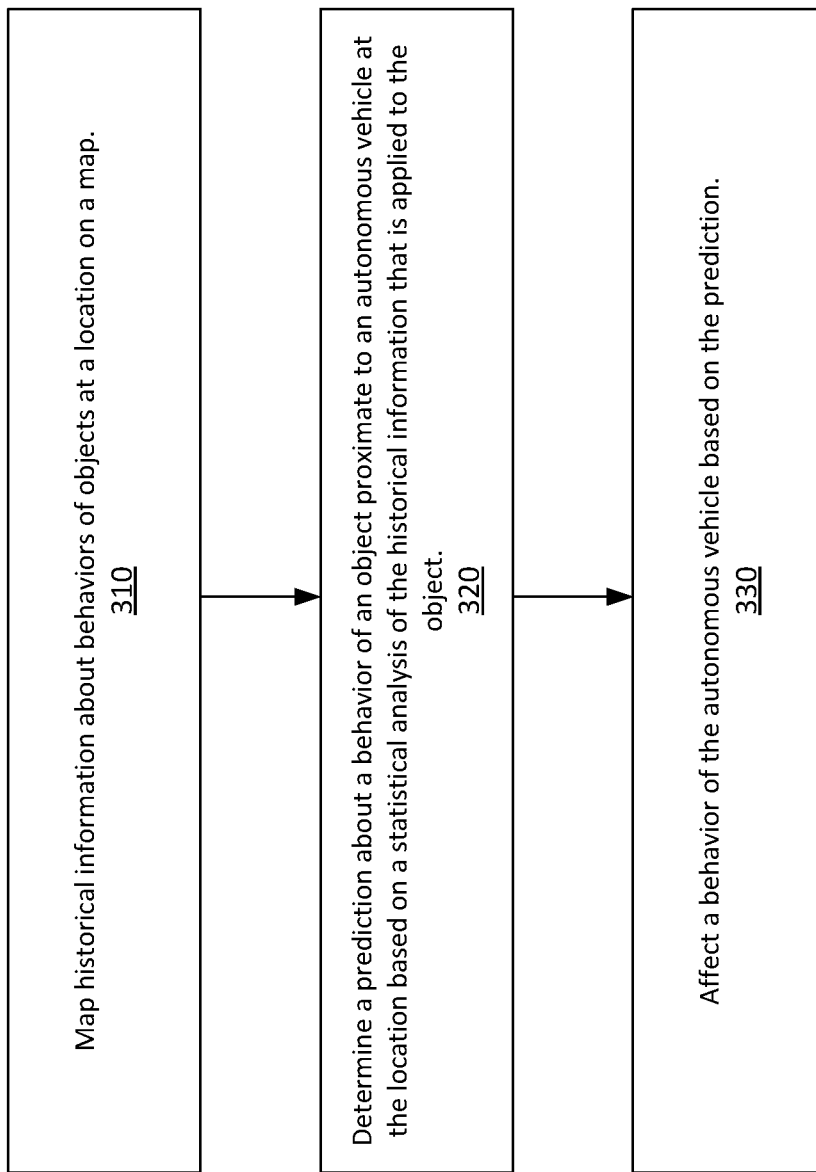
FIG. 3 shows an example method for predicting object behavior proximate to a navigating autonomous vehicle in accordance with some aspects of the present technology.

FIG. 3 shows an example method for predicting object behavior proximate to a navigating autonomous vehicle (AV) in accordance with some aspects of the present technology. Historical information about vehicle behavior at a specific location can be mapped (310) to a portion of the map. The historical data can be data related to object maneuvers, such as vehicles, pedestrians, buses, bikes, etc. that are proximate to the AV. For example, the historical data could be surrounding traffic, vehicles entering the road from a driveway, jaywalking pedestrians, etc.

In some embodiments, the historical information can be collected manually or from a third party entity. For example, the historical information can be provided from a person who sits outside an intersection and records how vehicles behave, or can be provided by stationary sensors placed with a field of view over a predetermined area. Other historical data sources could come from traffic studies that record how traffic behaves, such as studies directed to unsafe intersections, traffic flow, etc. In other embodiments, the historical information can be captured dynamically as the AV is navigating. The AV, using sensors on the AV such as a lidar sensor system, a radar sensor system, and/or a camera system, can track vehicles on the road in real- or near real-time. For example, the AV can track, based on data from the lidar sensor system, how many and/or the rate at which vehicles make a turn from specific origination lanes to specific destination lanes. The AV may additionally track a path of each vehicle or other object, such as positional information, positional information relative to semantic map features, temporal information, and the like. In some embodiments, the historical information can be a combination of manual and AV collection techniques.

In some embodiments, surrounding conditions in which the behaviors of other vehicles can be captured as well, such as the current time, average traffic rates, the surrounding environment, types of zones (e.g., school zone), overhanging vegetation or buildings, etc.

A prediction about a behavior of an object proximate to the autonomous vehicle at a specific location can then be determined (320) based on the mapped historical information. For example, the prediction can be based on a statistical analysis of the historical information that is applied to the object. For example, the historical information can be aggregated and analyzed to determine probabilities for lane transitions (in some embodiments this can be added to the map as a lane transition probability layer).

Lane transitions can be represented as relationships between certain vehicle behaviors and locations based on one or more generated heuristics. For example, relationships can be tracked within the historical data to predict how a vehicle may behave. For example, the system can track how vehicles make turns from different lanes (e.g., in a specific turn only lane, vehicles are 90% likely to illegally go straight through an intersection instead of turning). These heuristics can be based on a query that can be matched up to logic that describes the relationship. In some embodiments, the heuristics can generate relationships that are based on geographic location and/or are also feature related. In some embodiments, the heuristics can be manually created.

In some embodiments, the relationships can be dynamically tracked and determined using machine learning (ML) models. The AV's within the fleet can capture and collect data on the road over time. The data can then be used as the basis for the historical data that will train one or more ML models, which can dynamically extract relationships and probabilities from the historical data. In some embodiments, the ML models can be based on certain conditions that affect the probabilities (e.g., conditional probabilities, such as the probability of an event given that another has occurred). For example, a relationship of vehicles illegally going straight through an intersection can be probabilistically higher when the time is during rush hour rather than 8 pm.

In some embodiments, mapping the historical information on the map can include an index of observed vehicle paths within an area. Statistical analysis of the historical information can determine a prediction of a path of the vehicle based on that index of observed vehicle paths. Lane IDs can be provided for each lane so that the path from one lane to the other lane can be indexed easily, and a probability can be assigned to each lane ID.

The techniques described for tracking and applying relationships to tracked objects can be applied to more than just vehicle lane changes. Probabilities for each potential path can be predicted for any object and their associated behavior that can be determined by a path based solution. For example, the paths of jaywalkers and an associated time of day can be collected over some period of time. At a certain time, it can be determined that school has gotten out and there will be a larger number of jay walkers at that particular location and time. The AV can then modify its own behavior to go slower or be more cautious in that location until the rush after school has died down. Other examples are places are bike paths. The AV can avoid streets that are common bike paths or inform the AV to drive in a way that preserves bike safety. In some embodiments, the AV can avoid common bike paths depending on context, such as avoiding those areas during historically congested times.

Therefore, based on the prediction about how a vehicle will behave based on historically similar vehicles and/or situations, the AV's behavior can be affected (330) in response to and/or in anticipation of that predicted behavior. For example, the AV can change its route, proactively change lanes, slow down/speed up, stop, avoid certain driveways, etc.

Figure 4:
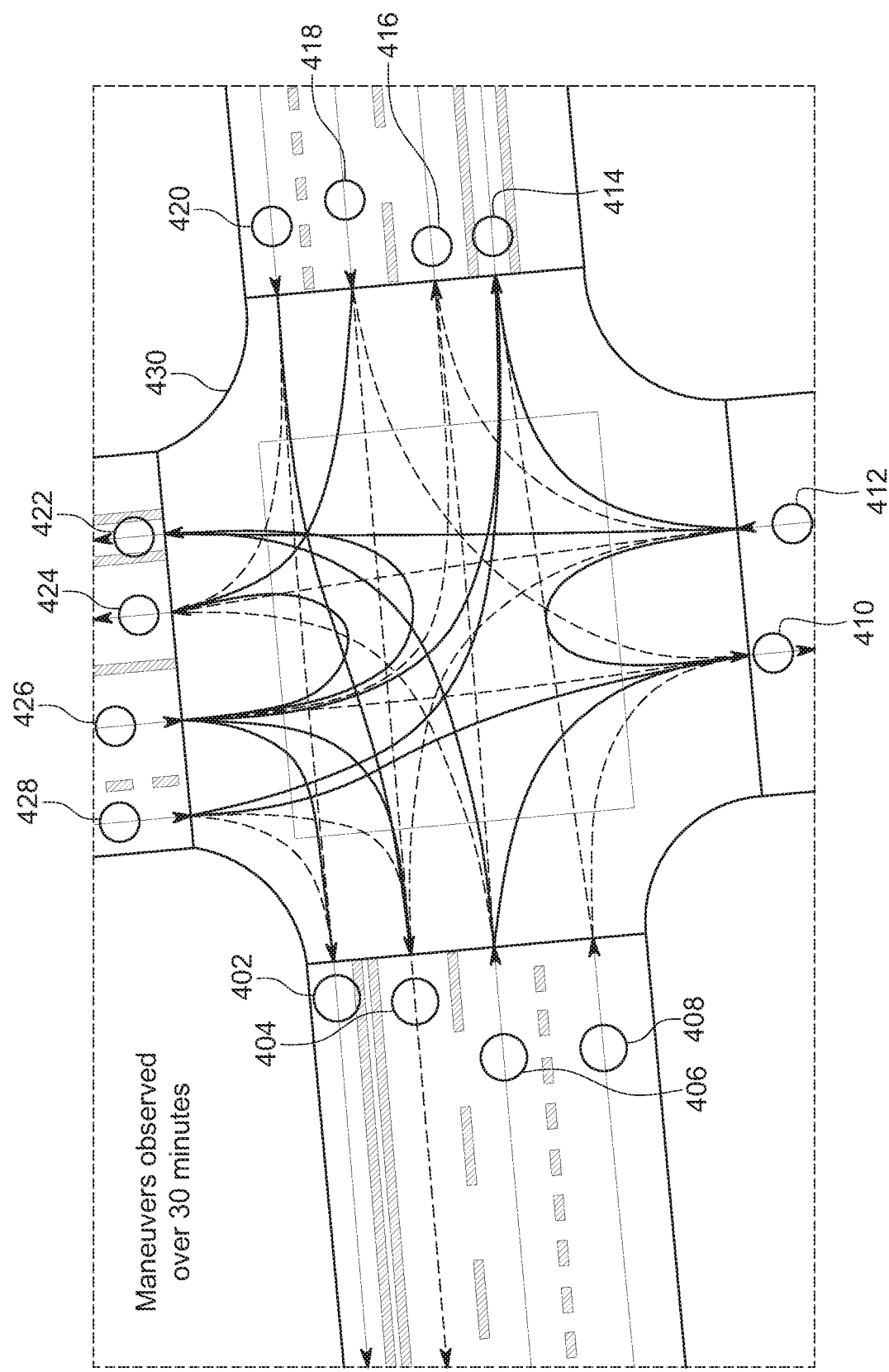
FIG. 4 shows an example visualization of historical object behavior in accordance with some aspects of the present technology.

FIG. 4 shows an example visualization of historical object behavior in accordance with some aspects of the present technology. In this example, vehicles are tracked as they are making turns from an origination lane to a destination lane (e.g., which path the vehicle takes) at a specific intersection. Based on an analysis of how the vehicles turn, such as the rates at which vehicles turn into specific destination lane from each origination lane, statistical probabilities for each path can be determined and assigned. Subsequently, when a vehicle on the road approaches the intersection, that vehicle can be assigned a statistical probability for each potential path.

For example, map 400 shows intersection 430 with lanes 404, 406, 408, 410, 412, 416, 418, 420, 424, 426, and 428, and bike lanes 402, 414, and 422. Some lanes are legally coupled directly to other lanes, such as lane 428 to lane 402 and 404. However, vehicles often change lanes mid-intersection 430 and turn from lane 428 to lane 410 or bike lane 414. Via surveying or AV data, the system determines that vehicles (or bikers) travel from lane 428 to lane 404 65% of the time, to lane 402 5% of the time, to lane 410 20% of the time, and to bike lane 414 10% of the time. This means that vehicles perform illegal lane changes mid-intersection 430 30% of the time. Because the AV would be configured to avoid illegal turns, the AV may not map lane 410 and bike lane 414 as a turn option, and thus an observed vehicle making such a turn would be unexpected based on the AV's driving options.

This problem can affect multiple paths through the intersection 430. In this example embodiment, the black path lines are illegal turns, while the dashed path lines are legal turns included within the AV's repertoire of navigation options. Specifically, the paths that are illegal are from: lane 406 to bike lane 422 and lane 410; lane 412 to lane 410, bike lane 414, and bike lane 422; lane 418 to lane 424; lane 420 to lane 404; lane 426 to bike lane 402, lane 404, bike lane 414, bike lane 422, and lane 424; and lane 428 to lane 410 and bike lane 414. This means that 14 out of 29 paths are illegal turns (or 48.3% of observed paths are illegal).

Figure 5:
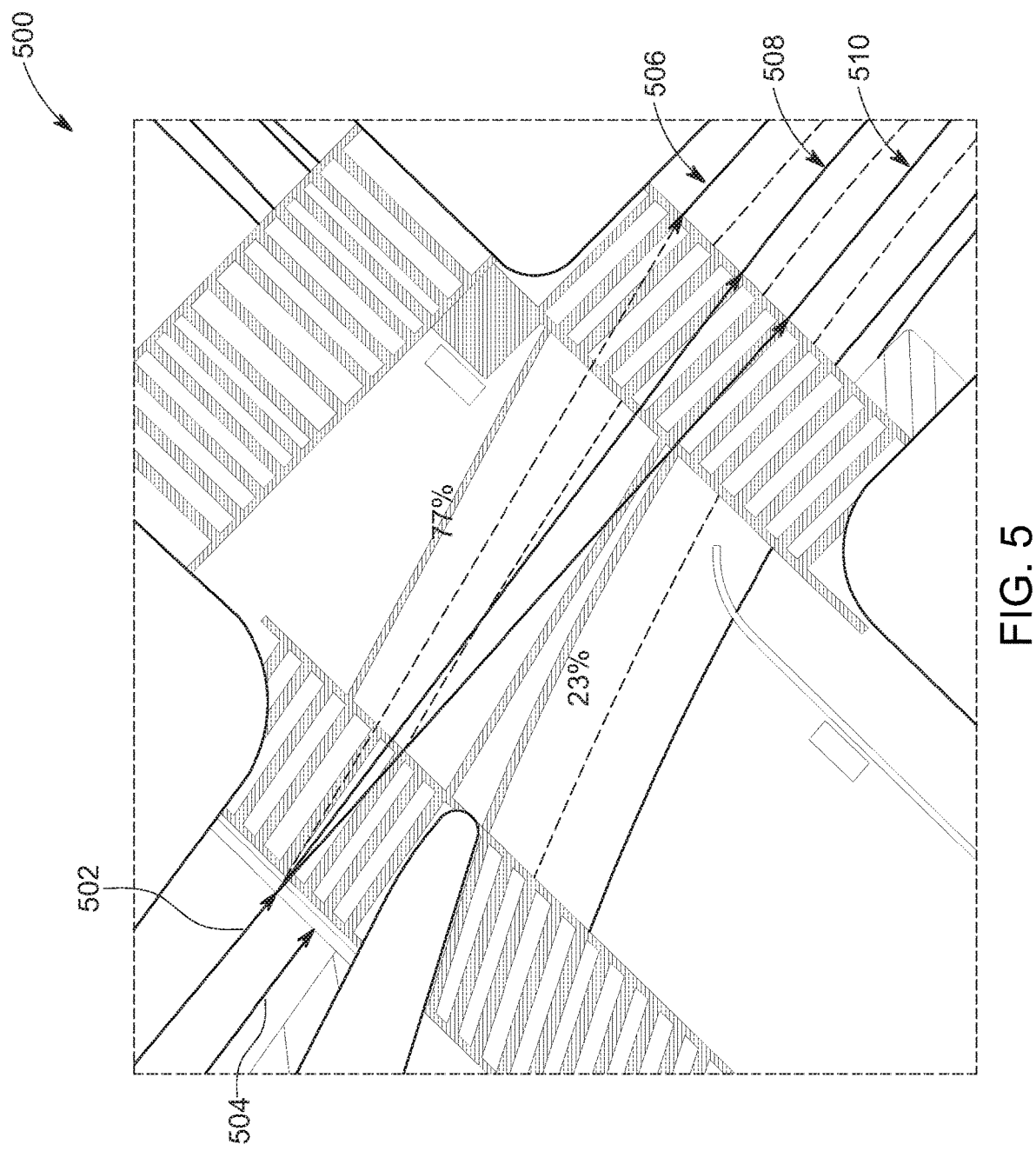
FIG. 5 shows an example visualization of historical and predicted object behavior in accordance with some aspects of the present technology.

FIG. 5 shows a further example visualization of historical and predicted object behavior in accordance with some aspects of the present technology. Intersection 500 includes lanes 502, 504, 506, 508, and 510. In this example, vehicles stay within the correct lane (e.g., lane 506) 77% of the time (dashed line), but illegally turn into lanes 508 or 510 23% of the time (solid lines). Therefore, historically vehicles at intersection 500 use a turn only lane to drive straight through the intersection 500 to merge into other lanes at the other side of intersection 500. If a threshold proportion of vehicles drive through turn lane 502 with no intent to turn, then the AV could anticipate this potential behavior and drive more cautiously around the vehicle. For example, the AV could not drive as close to the other vehicle, watch for the other vehicle drifting into the AV's turn lane, etc.

In some embodiments, the probabilistic information for historical vehicle paths can be included as information in the map. For example, the map (such as at each update) can include semantic data that at intersection 500, vehicles originating from lane 502 have a 77% chance of driving into lane 506 and a 23% chance of driving into lanes 508 and/or 510. In some embodiments, this semantic data can be used to generate a weighted list of origination and destination lane paths (stored within a table of lanes at specific intersections), which can inform predictions for subsequent vehicles as an AV is driving through intersection 500. The semantic data can represent this information as bins of percentile paths; such that some lanes are within the $77^{th}$ percentile (path from lane 502 to lane 506), some lanes are within the $23^{rd}$ percentile (path from lane 502 to lanes 508, 510), etc.

Figure 6:
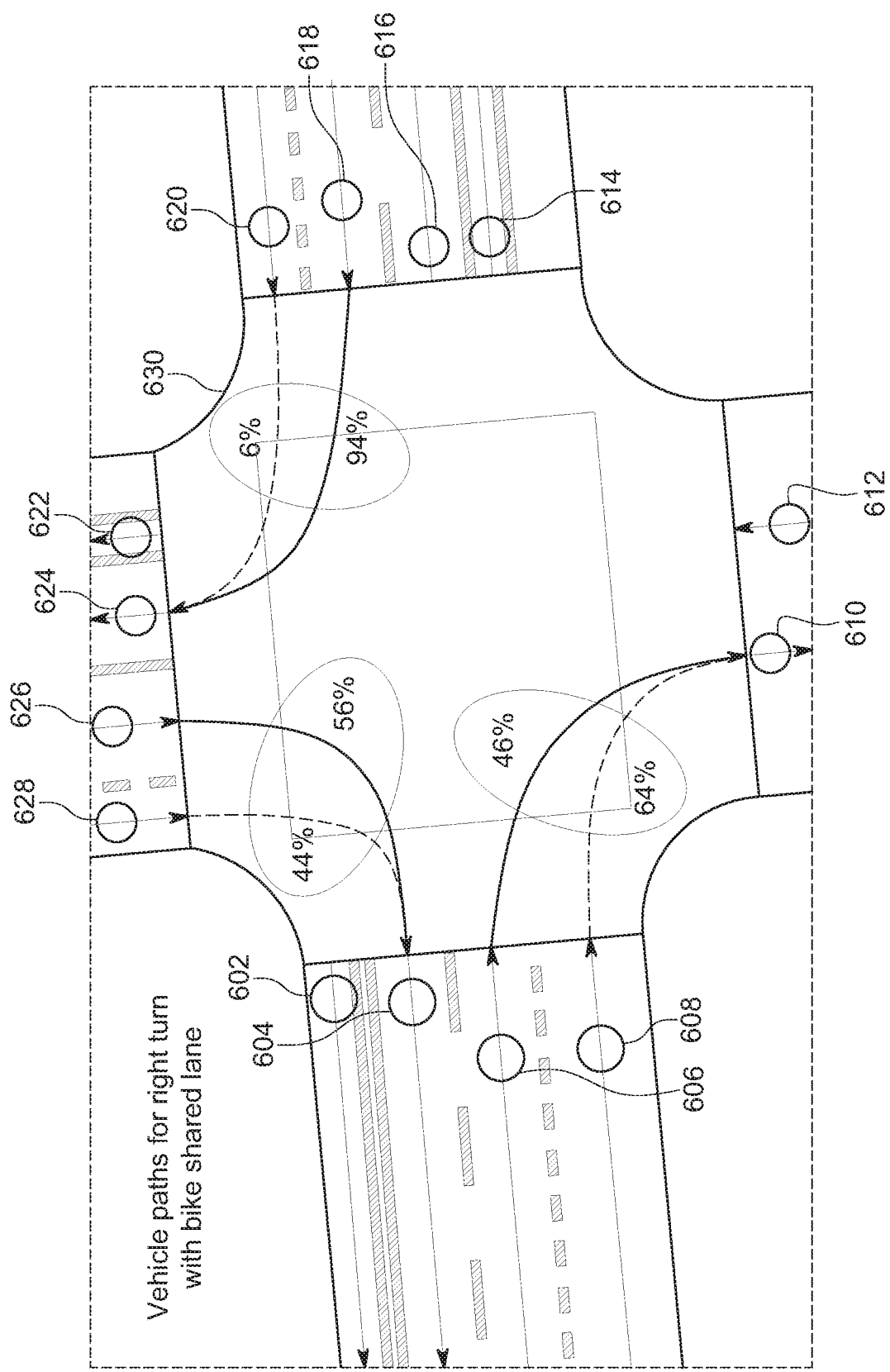
FIG. 6 shows an example visualization of historical and predicted object behavior in accordance with some aspects of the present technology.

FIG. 6 shows an example visualization of historical and predicted object behavior in accordance with some aspects of the present technology. Intersection 630 includes lanes 602, 604, 606, 608, 610, 612, 614, 616, 618, 620, 622, 624, 626, and 628 and bike lanes 602, 614, and 622. In this example, the probabilistic rates for multiple turning lanes are shown, with legal turns shown in dashed lines and illegal turns shown in solid lines. For example, according to observations of vehicles within intersection 630, vehicles turn into lane 604 from lane 628 44% of the time and from lane 626 56% of the time. Vehicles turn into lane 610 from lane 608 64% of the time and from lane 606 46% of the time. Vehicles turn into lane 624 from lane 620 6% of the time and from lane 618 94% of the time. This means that for right turns in intersection 630, vehicles were turning illegally 56%, 46%, and 94% of the time from lane 626, lane 606, and lane 618, respectively. These are significant rates of vehicles performing illegal maneuvers, and accordingly can be predicted and anticipated when the AV navigates intersection 630.

Figure 7A:
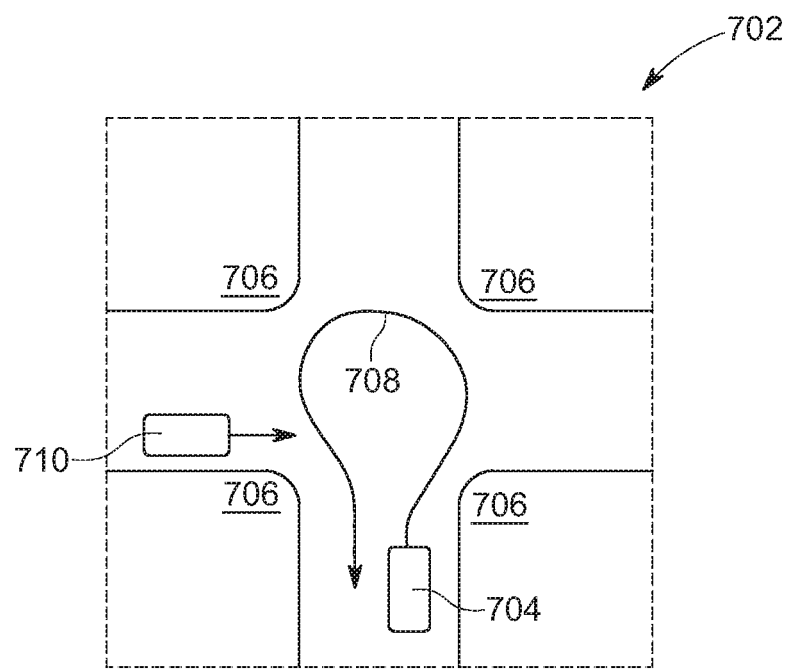
FIG. 7A shows an example visualization of historical object behavior in accordance with some aspects of the present technology.

FIG. 7A shows an example visualization of historical object behavior at a four way stop in accordance with some aspects of the present technology. In this example, road area 702 includes four stops 706 within a four way stop configuration. AV 710 may be waiting at or approaching stop 706 when vehicle 704 enters road area 702. According to historical data, past vehicles have taken the path 708 (e.g., an illegal u-turn) about 46% of the time. Therefore, based on the historical data and/or any other indications that vehicle 704 will take path 708 (e.g., such as drifting to the far right of the lane to provide more of a turning radius), AV 710 can wait before it proceeds through the four way stop in case vehicle 704 takes path 708, therefore avoiding a collision. Therefore, these techniques can be especially helpful when the AV 710 is getting conflicting signals from a vehicle 704 driving down the road. For example, vehicle 704 may be driving in such a way that it would be difficult to determine whether vehicle 704 wants to change lanes and turn, or go straight through road area 702, and the statistical prediction can help AV 710 prepare for this (or at least drive cautiously). For example, being able to predict more accurately that vehicle 704 will drive in front of AV 710 as it doubles back will help AV 710 avoid a collision, since AV 710 can pause a little longer. Moreover, the prediction can also avoid AV 710 from getting rear ended if it makes a sudden stop to avoid a collision or near collision with vehicle 710.

Figure 7B:
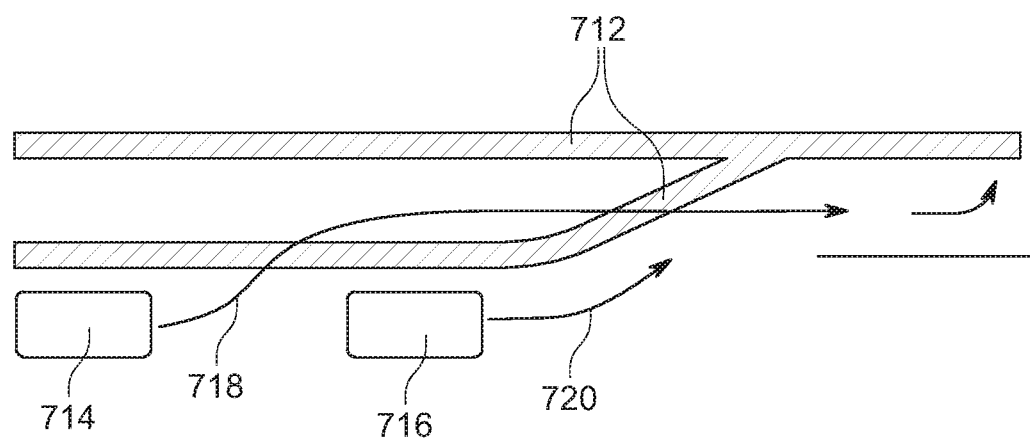
FIG. 7B shows an example visualization of predicted object behavior in accordance with some aspects of the present technology.

FIG. 7B shows an example visualization of predicted object behavior in a shared left turn lane in accordance with some aspects of the present technology. In this example, shared left turn lane 712 shows AV 716 approaching a left turn, as well as vehicle 714 approaching the left turn as well (but behind AV 716). According to the historical data, there has been about a 25% chance that vehicles will attempt to drive past vehicles in front by driving through shared left turn lane 712 to get to the left turn lane sooner, even though that cuts off the front vehicle and is illegal (shared left turn lane 712 is for turning only). Therefore, when AV 716 approaches the left turn lane, and vehicle 714 changes into shared left turn lane 712 and/or speeds up, AV 716 can predict that there is at least a 25% chance that vehicle 714 will cut it off and move in front to turn left. Moreover, the predictions can be based on conditional probabilities. For example, the predictions may have a higher probability for certain maneuvers based on present conditions such as, but not limited to, the time of day (e.g., night or day? Rush hour?), traffic rate (e.g., low traffic vs. heavy traffic), surrounding environment (e.g., in a school zone? Along a bus route? By a fire station or a police station?), etc. For example, if the historical data shows the road is by a fire station, the AV 716 can predict that there will be a higher likelihood that fire trucks, ambulances, etc. will need the right of way. AV 716 can then yield accordingly.

In some embodiments, the predictions can be conditional based on the type of vehicle or object. For example, if the object is a school bus or a scooter, the predictions for illegal behavior may be increased (and cause the AV to be more cautious) to account for extra safety measures than if the object is a motorcycle. Similarly, to increase both driver and motorcyclist safety, the AV may predict higher probabilities for illegal behavior (and cause the AV to be more cautious) than if the other object is another vehicle.

In some embodiments, the prediction for vehicle behavior can be based on intersection type. For example, if a bus route is present, the AV can tailor its predictions with expected bus behavior. Specifically, in some embodiments the AV can capture (through cameras) and determine the number of the bus and/or its destination, etc. (this information can be stored within known bus schedules or gleaned from the bus itself advertising this information). As a result, the system can predict that the bus has a very high probability of making a left turn that conforms to the matching bus route.

In some embodiments, the prediction can take into account behaviors of vehicles as they enter and/or exit driveways. For example, the historical data can illuminate which driveways are most used and when, where vehicles enter and/or exit the driveway, which lanes vehicles use to enter and/or exit the driveway, etc. This can also apply to parking spaces. For example, vehicles (especially rideshare vehicles) may swerve suddenly across lanes to a parking spot in order to pick up a passenger. If the historical data shows that a certain stretch of road with a parking spot is active in picking up/dropping off passengers, then the AV can be more cautious in those areas or proactively merge away from these lanes. Conversely, if an area is not historically active, then predictions that a vehicle will swerve to a parking spot may be devalued.

In some embodiments, the historical information can cause the AV to drive more naturally. For example, if paths show vehicles turning from an origination lane to a destination lane, and the vehicle biases/drifts to the right in the origination lane before turning, the AV may also drift right to match the majority of other vehicle's behaviors. This more natural behavior can serve to cue other drivers on the road what the AV intends to do, giving the other drivers notice of the AV's intentions. This can also be applied to certain lane types. For example, some streets are very wide, and most vehicles treat a single lane as two lanes when turning (e.g., a turning vehicle will stack up next to a vehicle going straight). If the historical data has enough paths that it can predict this is a common occurrence, the AV can anticipate this behavior and update its pathing and behavior.

In some embodiments, the historical data can predict creep points for the AVs, or where in the intersection the AV should drive before it makes a left turn. Creep points mark where other vehicles need to pull up to in order to see oncoming traffic. The AV could similarly creep up to a point where a majority of vehicles have creeped up in the past, and thereby improve its ability to detect oncoming traffic.

In some embodiments, the AV can anticipate light changes. For example, the AV can receive time cards for each traffic light. The AV could use this information to determine when a light will be green, how long it will be yellow before it turns red, and when it will turn red. In this way, the AV can accurately predict when the traffic light will turn green and it can proceed through an intersection. In some embodiments, this information can be used as input to routing the AV such that it maximizes green lights and minimizes the time spent at red lights. In some embodiments, the AV can see the light turn yellow/red and inform other AVs within the area of the light change.

In some embodiments, data collection can be affected by certain conditions the AV encounters as it navigates. For example, as the AV captures the behavior of a vehicle it is tracking, the AV can determine the type of vehicle. In some embodiments, the determination can be done by analyzing camera or lidar data. Based on the type of vehicle, the quality of data collection can be adjusted by the AV such that some types of vehicles raise the quality of data collection and some types of vehicles lower the quality of data collection. For example, the AV could enter a school zone. At certain times of day, such as when children have been let out of school, are arriving for the day, or are let off for recess, the likelihood of human traffic (school crossing guard, children) will increase. During those periods of time, the AV could choose to run more expensive and slow computer vision models to predict a pedestrian. Conversely, outside of those times, the AV could run faster, less computationally expensive computer vision models to save on processing and compute resources.

In some embodiments, the AV can avoid certain roads that have a critical bike mass. For example, some roads may get clogged with a large number of bikes at certain times of the day, making driving difficult or resulting in the AV driving behind a bike and matching their pace (which is uncomfortable for both the biker and the passenger of the AV). These roads could be avoided if the historical data shows a critical mass of bike activity.

In some embodiments, the historical data can help the AV determine if the lidar data is capturing fog or something else (e.g., pedestrians). For high fog areas, the AV could assign a higher likelihood than for areas where fog is uncommon.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 8:
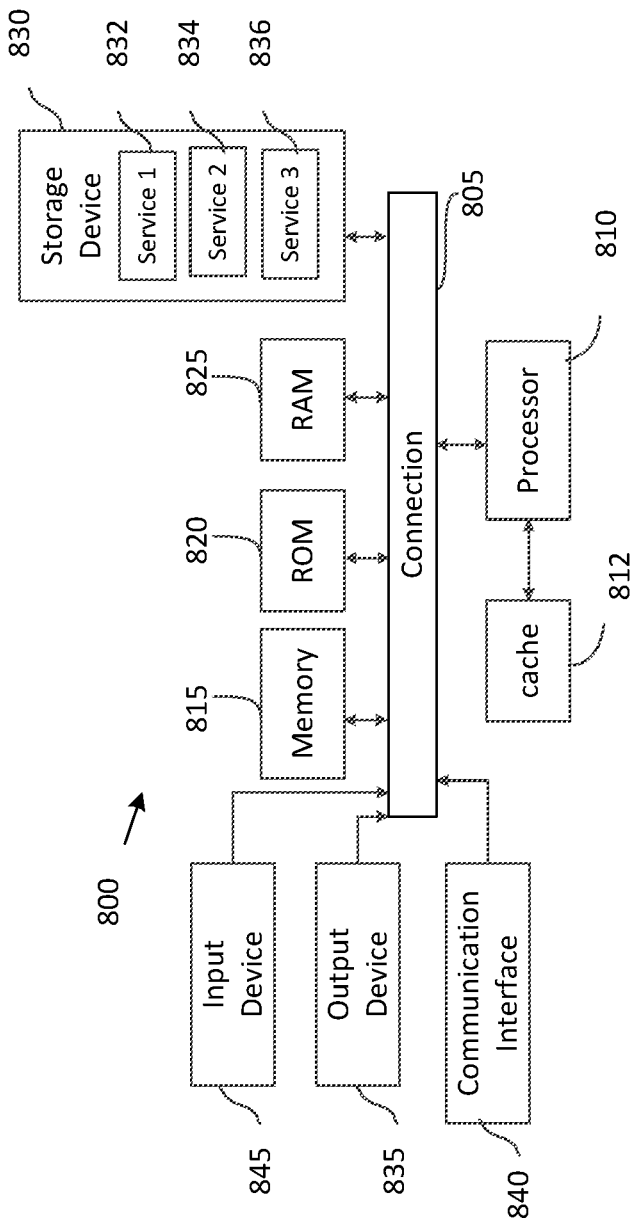
FIG. 8 shows an example of a system for implementing certain aspects of the present technology.

FIG. 8 shows an example of computing system 800, which can be for example any computing device making up internal computing system 110, remote computing system 150, (potential) passenger device executing rideshare app 170, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    mapping historical information about behaviors of objects at a location in a probability layer of a map, wherein the probability layer indicates probabilities that an object may deviate from legal maneuvers;
    performing a statistical analysis of the historical information applied to an object proximate to an autonomous vehicle at the location to determine a statistical probability of the object performing an illegal maneuver;
    assigning the statistical probability as semantic data for the illegal maneuver, wherein the autonomous vehicle further utilizes a semantic layer of the map, wherein the semantic layer defines legal maneuvers for the autonomous vehicle, and wherein the illegal maneuver is a maneuver that violates the semantic layer of the map;
    based on the statistical analysis, determining a prediction of the object performing the illegal maneuver; and
    affecting a behavior of the autonomous vehicle based on the prediction.

2. The method of claim 1, the method further comprising:
    capturing the historical information about the behaviors of objects at the location and a condition in which the behaviors of objects occur; and
    generating one or more models of object behavior at the location based on the captured historical information, wherein the one or more models provide conditional predictions based on the condition.

3. The method of claim 1, wherein mapping the historical information includes an index of observed object paths within an area, and wherein the statistical analysis of the historical information determines a prediction of a path of the object based on the index of observed object paths.

4. The method of claim 1, further comprising:
tracking objects making a turn from an origination lane to a destination lane; and
determining a statistical probability based on the statistical analysis of a subsequent object making the turn from the origination lane to the destination lane, wherein the turn is an illegal turn.

5. The method of claim 1, wherein a relationship between a behavior and a specific location is generated based on one or more heuristics.

6. The method of claim 5, wherein the heuristics is a machine learned model that dynamically extracts the relationship that has not been manually identified.

7. The method of claim 1, the method further comprising:
capturing the behavior of the object via a sensor on the autonomous vehicle as the autonomous vehicle navigates;
determining a type of object based on the sensor; and
based on the type of object, adjusting a quality of data collection by the autonomous vehicle such that a first type of object raises the quality of data collection and a second type of object lowers the quality of data collection.

8. A system comprising: an autonomous vehicle; and
a processor for executing instructions stored in memory, the processor in communication with the autonomous vehicle and wherein execution of the instructions by the processor:
map historical information about behaviors of objects at a location in a probability layer of a map, wherein the probability layer indicates probabilities that an object may deviate from legal maneuvers;
perform a statistical analysis of the historical information applied to an object proximate to the autonomous vehicle at the location to determine a statistical probability of the object performing an illegal maneuver;
assign the statistical probability as semantic data for the illegal maneuver, wherein the autonomous vehicle further utilizes a semantic layer of the map, wherein the semantic layer defines legal maneuvers for the autonomous vehicle, and wherein the illegal maneuver is a maneuver that violates the semantic layer of the map;
based on the statistical analysis, determine a prediction of the object performing the illegal maneuver; and
affects a behavior of the autonomous vehicle based on the prediction.

9. The system of claim 8, wherein execution of the instructions by the processor further:
capture the historical information about the behaviors of objects at the location and a condition in which the behaviors of objects occur; and
generate one or more models of object behavior at the location based on the captured historical information, wherein the one or more models provide conditional predictions based on the condition.

10. The system of claim 8, wherein mapping the historical information includes an index of observed object paths within an area, and wherein the statistical analysis of the historical information determines a prediction of a path of the object based on the index of observed object paths.

11. The system of claim 8, wherein a relationship between a behavior and a specific location is generated based on one or more heuristics.

12. The system of claim 11, wherein the heuristics is a machine learned model that dynamically extracts the relationship that has not been manually identified.

13. The system of claim 8, wherein execution of the instructions by the processor further:
captures the behavior of the object via a sensor on the autonomous vehicle as the autonomous vehicle navigates;
determine a type of object based on the sensor; and
based on the type of object, adjust a quality of data collection by the autonomous vehicle such that a first type of object raises the quality of data collection and a second type of object lowers the quality of data collection.

14. A non-transitory computer readable medium comprising instructions, the instructions, when executed by a computing system, cause the computing system to:
map historical information about behaviors of objects at a location in a probability layer of a map, wherein the probability layer indicates probabilities that an object may deviate from legal maneuvers;
perform a statistical analysis of the historical information applied to an object proximate to the autonomous vehicle at the location to determine a statistical probability of the object performing an illegal maneuver;
assign the statistical probability as semantic data for the illegal maneuver, wherein the autonomous vehicle further utilizes a semantic layer of the map, wherein the semantic layer defines legal maneuvers for the autonomous vehicle, and wherein the illegal maneuver is a maneuver that violates the semantic layer of the map;
based on the statistical analysis, determine a prediction of the object performing the illegal maneuver; and
affect a behavior of the autonomous vehicle based on the prediction.

15. The non-transitory computer readable medium of claim 14, the instructions further causing the computing system to:
capture the historical information about the behaviors of objects at the location and a condition in which the behaviors of objects occur; and
generate one or more models of object behavior at the location based on the captured historical information, wherein the one or more models provide conditional predictions based on the condition.

16. The non-transitory computer readable medium of claim 14, wherein mapping the historical information includes an index of observed object paths within an area, and wherein the statistical analysis of the historical information determines a prediction of a path of the object based on the index of observed object paths.

17. The non-transitory computer readable medium of claim 14, wherein a relationship between a behavior and a specific location is generated based on one or more heuristics.

18. The non-transitory computer readable medium of claim 17, wherein the heuristics is a machine learned model that dynamically extracts the relationship that has not been manually identified.

19. The method of claim 1, wherein the semantic layer distinguishes between legal and illegal maneuvers for the autonomous vehicle.

20. The method of claim 1, wherein the probability layer includes a table identifying paths the object can take by indicating a relationship between originating positions and destination positions.

* * * * *